United States Patent [19]

Geddes et al.

[11] 3,959,420

[45] May 25, 1976

[54] DIRECT QUENCH APPARATUS

[75] Inventors: Ray L. Geddes, Fort Myers, Fla.;
Harry D. Robinson, Jr., Abington, Mass.

[73] Assignee: Stone & Webster Engineering Corporation, Boston, Mass.

[22] Filed: May 23, 1972

[21] Appl. No.: 255,970

[52] U.S. Cl. .......................... 261/112; 261/DIG. 54
[51] Int. Cl.$^2$ ................................. B01F 3/04
[58] Field of Search ..................... 261/112, DIG. 54

[56] References Cited
UNITED STATES PATENTS

| | | | |
|---|---|---|---|
| 1,999,589 | 4/1935 | Frey | 261/DIG. 54 |
| 2,259,031 | 10/1941 | Fisher | 261/DIG. 54 |
| 3,057,605 | 10/1962 | Stone | 261/112 |
| 3,164,644 | 1/1965 | Ghetto et al. | 261/112 |
| 3,182,977 | 5/1965 | Erni | 261/112 |
| 3,317,197 | 5/1967 | Lohner et al. | 261/112 |
| 3,471,138 | 10/1969 | Lohner | 261/112 |
| 3,593,968 | 7/1971 | Geddes | 261/112 |
| 3,610,591 | 10/1971 | Ziliotto | 261/112 |
| 3,696,590 | 10/1972 | Richmond | 261/112 |

FOREIGN PATENTS OR APPLICATIONS

| | | | |
|---|---|---|---|
| 1,247,851 | 10/1960 | France | 261/DIG. 54 |
| 904,917 | 9/1962 | United Kingdom | 261/112 |

Primary Examiner—Tim R. Miles
Attorney, Agent, or Firm—Morgan, Finnegan, Pine, Foley & Lee

[57] ABSTRACT

An apparatus for effecting direct quench of pyrolysis furnace effluent. A quench tube sized somewhat larger in diameter than the furnace effluent pipe is provided with an upper inverted ring and an external housing surrounding the terminus of the furnace effluent pipe, the quench tube and the inlet to the transfer pipe. The housing includes a chamber for quench oil, insulation space and purge gas space. In operation, quench oil is introduced continuously into the housing chamber and over the lip of the inverted ring to flow continuously down the sides of the quench tube inner wall.

12 Claims, 1 Drawing Figure

U.S. Patent    May 25, 1976    3,959,420
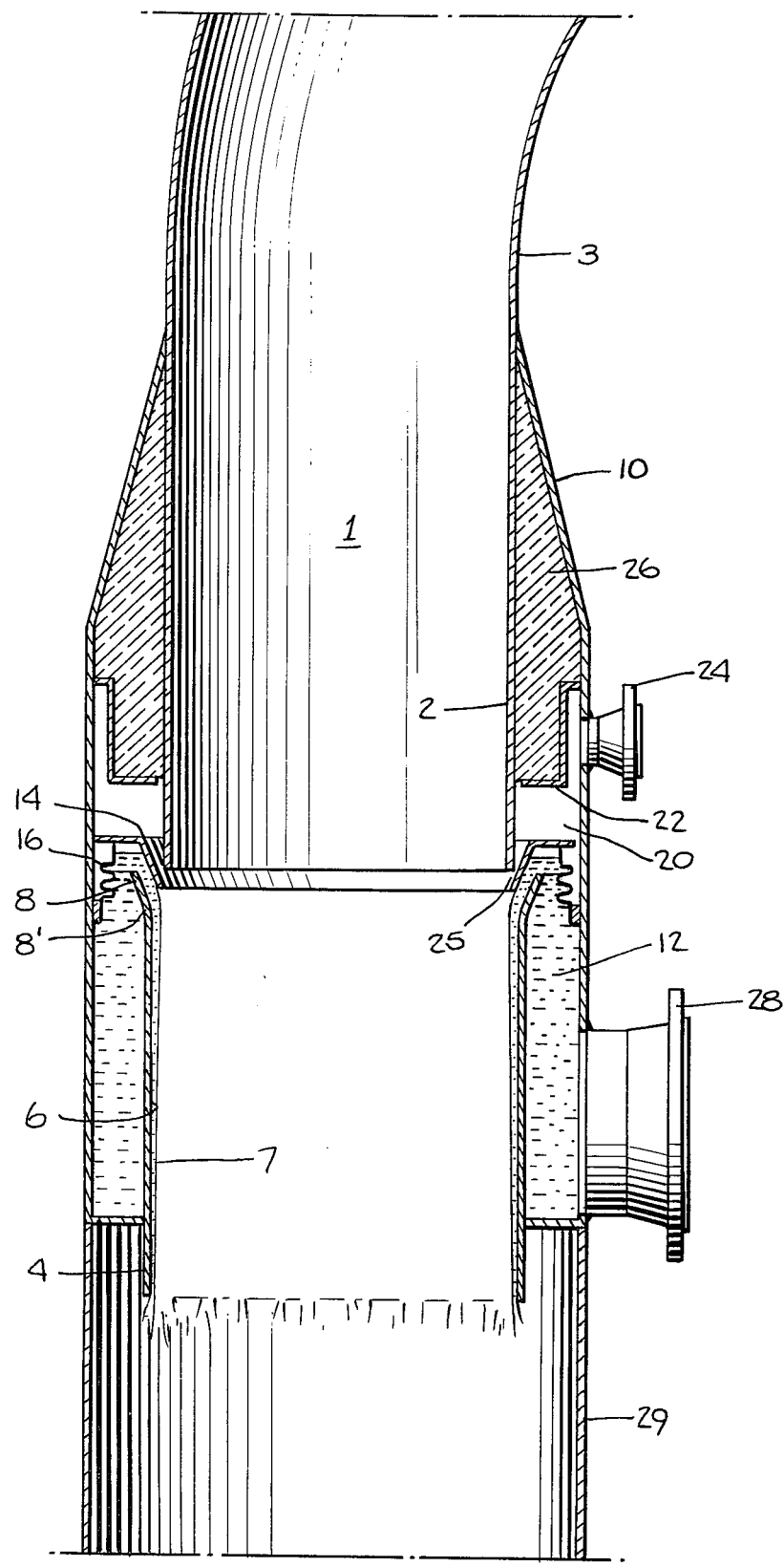

DIRECT QUENCH APPARATUS

BACKGROUND OF THE INVENTION

1. Field of the Invention

This invention is directed to an apparatus for cooling or quenching product by direct quenching. More specifically, the apparatus has particular application to cooling the effluent from pyrolysis furnaces.

2. Description of the Prior Art

In the production of ethylene and similar products, it is customary to thermally crack hydrocarbons at high temperatures. The cracked effluent is then rapidly cooled or quenched by either direct, indirect or a combination of direct-indirect cooling means.

Rapid quenching of effluent is attended by the problem of fouling which results from the production of tars, coke, heavy polymers or other fouling material during the rapid cooling. These fouling products tend to coat the walls of the quench apparatus and inimically affect the heat transfer rate of the apparatus and, in some cases, clog the apparatus. As a result, shut down of the pyrolysis plant or the employment of on-stream cleaning techniques is necessary to rid the quench apparatus of the fouling materials. The practitioners in the art have attempted to develop various techniques for the avoidance of accumulation of fouling material on the quenching apparatus. One successful method developed is to flow a film of quench oil down the sides of the wall of a direct quencher continuously during periods of the quenching operation. U.S. Pat. No. 3,593,968 (Geddes; July 20, 1971) discloses a process and apparatus for continuously flowing quench oil down the sides of a direct quencher wall during operation to reduce the accumulation of tars, polymers and other fouling components thereon.

SUMMARY OF THE INVENTION

It is an object of the present invention to provide an apparatus for retarding or avoiding the accumulation of tar, heavy polymer and other fouling components on the wall of a direct quencher.

To this end, a quench chamber having an inside diameter somewhat greater than the inside diameter of the effluent furnace tube, is arranged in axial alignment with the furnace effluent tube at the termination thereof. The size of the quench chamber tube is selected to provide an inner dimension of the quench oil film on the upper part of the wall of the quench chamber which is approximately the same as the inside dimension of the furnace effluent tube. The quench chamber is cylindrical and terminates in the transfer line which conveys the quenched mixture to other equipment for further processing. The transfer line is of larger diameter than the quench chamber to reduce the pressure loss in transit. A housing is provided around the terminal portion of the effluent tube and the quench chamber. The housing contains insulation means and a chamber for the passage of purge gas. The housing also includes in its lower section a reservoir area for quench oil. The reservoir area for quench oil extends from a location near the terminus of the quench chamber to a location slightly above the entry. The entry of the quench chamber is formed in the configuration of an inverted frustum with a curved transition configuration between the inverted frustum and the straight wall of the quench chamber. In operation, the quench oil is delivered to the reservoir and as the level of the quench oil in the reservoir rises to the top of the frustum, the quench oil flows over the upper edge thereof and into the interior of the quench chamber to provide a continuous film to the inner wall of the quench chamber. After initial contact in the quench chamber, the quench oil drops off the termination of the chamber and is dispersed by turbulence of the partially quenched gas so that quenching is completed in the transfer line. A flow rate is chosen as required for the quantity of quench heat to be absorbed.

DESCRIPTION OF THE DRAWING

The invention is hereinafter described in detail with reference to the drawing which is a sectional-elevational view of the terminal portion of a conventional pyrolysis effluent tube and the quench chamber with associated equipment of the present invention.

DESCRIPTION OF THE PREFERRED EMBODIMENT

The invention of the present application is a direct quench assembly 1 adapted to connect directly to the termination 2 of a furnace effluent pipe 3. The effluent gas is acceptably but not necessarily precooled, and discharges from the termination 2 of the furnace effluent pipe 3 to pass directly into the quench assembly 1 of the present invention and therein is partially cooled by quench oil. The combined gas and liquid effluent exits by a transfer line 29 wherein quenching is completed.

The direct quench assembly 1 is comprised essentially of a quench chamber 4 and an outer housing 10. The quench chamber 4 is configured identically to the termination 2 of the furnace effluent pipe 3, however, the inside dimensions of the quench chamber 4 are somewhat larger than the inside dimensions of the furnace effluent pipe 3. The relative sizes of the quench chamber 4 and the effluent pipe 3 are chosen to provide a condition wherein the film 7 of quench oil flowing down the inner wall 6 of the quench chamber 4 has essentially the same inside dimensions as the termination 2 of the furnace effluent pipe 3. Thus, when the quench chamber 4 and furnace effluent pipe 3 are circular in cross-section, the inside radius of the quench chamber will be larger than the inside radius of the furnace effluent pipe by at least the thickness of the film 7.

The quench chamber 4 is provided at its upper or entry end with a ring 8 which extends upwardly and outwardly from the quench chamber 4. The ring 8 extends from the quench chamber 4 outwardly and terminates in a larger diameter. The ring 8 is preferably contoured in cross-section to provide a curvilinear path for the entry of quench oil into the quench chamber. In practice, it has been found that a frusto-conical ring 8 with an angle of 45° to 10° with respect to the axis of the quench chamber 4 and a curvilinear connection member 8' located between the ring 8 and the quench chamber 4 is particularly suitable. The choice of the angle and curvilinear configuration depends on the rate of flow of quench oil into the quench chamber. Alternatively, the ring 8 can be a frusto-conical ring without the curvilinear connection member. The variation in the size and configuration of the ring 8 is solely to insure that the major portion of the quench oil flows directly down the sides of the wall 6 to provide a continually renewed continuous film 7 therefor. Practice has shown that while some quench oil may separate from the wall 6 to enter the effluent stream, a sizable proportion remains thereon.

The upper end of the external housing 10 connects to the pyrolysis effluent pipe 3 at the termination 2 and the lower end of housing 10 connects to the quench chamber 4 and to the transfer pipe 29. The housing 10 is configured to form a reservoir 12 for quench oil and to accommodate insulation means for the termination 2 of the effluent pipe 3. The reservoir 12 extends from a location intermediate the quench chamber 4 to a location above the top of the ring 8. This orientation affords the additional benefit of locating quench oil on the exterior of the wall 6 in the area wherein quench oil film 7 is flowing, thus, the film 7 is cooled indirectly by the quench oil in the reservoir 12. The quench chamber 4 terminates abruptly within the transfer pipe 29.

The insulation means extends from essentially the exit end of the termination 2 of the effluent pipe to an upstream location near the juncture of housing 10 with pipe 3. At the area near the end of the termination 2 of the effluent pipe, the housing 10 is provided with a baffle member 14 mounted on the housing by thermal expansion means such as an expansion bellows 16. The baffle member 14 shields the end of the pyrolysis effluent pipe from oil flowing over the inside of the ring 8. A purge gas chamber 20 is located immediately above the baffle 14 and is defined by the baffle 14, a second baffle 22 and the pipe 3. A fitting 24 is provided as an inlet to the purge gas chamber 20 and the space 25 between the baffle 14 and the pipe 2 affords access from the chamber 20 to the quench chamber 4. Steam or other inert purge gas is introduced through fitting 24 under pressure to pass through space 25 into the quench chamber 4, thereby preventing entry of the hot gas into the insulation means located above baffle 14. The wall 22 cooperates with the upper end of the housing 10 to form a chamber for accommodating insulation means which is shown in the drawing as solid compressible insulation 26. The insulation 26 serves to protect the central portion of the housing 10 from being heated by the pipe 3 so that there will be a gradual transition of temperature through the body of the housing 10 from the end which is heated by attachment to the pipe 3, to the end which is cooled by the quench oil in reservoir 12. Other insulation means such as a radiation baffle with insulating spaces (not shown) may be substituted for solid insulation 26 to serve the same purpose.

A fitting 28 is provided to afford an inlet to the quench oil reservoir 12. The quench oil is introduced into the reservoir 12 through the inlet 28 and allowed to rise to the top of the ring 8.

In operation, furnace effluent gas is passed from the termination 2 of the furnace effluent pipe directly into the quench chamber 4. Concomitantly, quench oil is pumped through inlet 28 into the reservoir 12 and over the lip of the ring 8. The quench oil flows down the sides of the walls and there performs the dual function of partially quenching the effluent and providing a film 7 on the wall to inhibit the accumulation of tar, coke or other fouling product thereon. At the termination of the quench chamber 4, the quench oil is dispersed in the transfer pipe 29 by partially quenched gas.

In practice, it has been found that the quench liquid entering over the ring 8 should avoid contacting the termination 2 of the furnace effluent pipe. Contact should be avoided to prevent overheating of the liquid or overcooling of the pipe 2, either of which promotes the growth of coke at the point of contact. The deflecter plate or baffle 14 performs this function.

An example of the operation of the quench chamber of the subject invention is as follows:

Pyrolysis effluent entering the quench chamber 4 at an inlet temperature of 1200°F. and a linear velocity of about 600 feet per second is cooled and quenched to 450°F. by the quench oil entering over ring 8 at 400°F. The desired cooling can be effected when the quench oil is pumped into the quench chamber at the rate of 100 gallons per minute per foot of quench chamber circumference. With the frusto-conical ring 8 having an angle of 30°, the oil does not depart from the frusto-conical ring 8 and the major portion flows down the wall 6 forming film 7 of about ¼ inch in thickness. The gas is partially cooled by contact with the film 7 which then falls from the terminus of the quench chamber 4 and is dispersed by the turbulence of the pyrolysis gas in the transfer line 29. A sufficient portion of the dispersed liquid impinges on the wall of the transfer line 29 below the quench chamber to maintain it wetted and free of inimical coatings, while the major portion of the liquid joins in intimate contact with the effluent to complete the quenching.

If desired, the quench chamber of the present invention can be provided with additional lateral quench nozzles to provide additional quench oil for quenching extremely large or very hot effluent flow.

It should be noted that the term film has been used to describe the quench oil flowing down the wall of the quench chamber. This term is not meant to limit the thickness of the quench oil on the wall to any particular range since the quench oil film may have a substantial thickness.

We claim:

1. An apparatus for direct quench of pyrolysis gases issuing from a pyrolysis effluent pipe comprising:

a quench chamber arranged in series alignment following the pyrolysis effluent pipe, which quench chamber is configured in cross-section uniformly in the shape of the termination of the effluent pipe and the inside dimensions of the quench chamber are uniformly larger throughout the entire length thereof than the dimension of the inside diameter of the effluent pipe by the thickness of the layer of quench oil used to flow down the quench chamber inner wall;

a ring on the entry end of the quench chamber extending upwardly and outwardly therefrom in proximity to the terminus of the effluent pipe;

means to protect the effluent pipe from quench oil flowing over the ring;

a quench oil reservoir arranged concentrically around the upper portion of the quench chamber extending above the top of the ring; and means to introduce quench oil into the quench oil reservoir and over the upper edge of the ring into the interior of the quench chamber to flow down the walls thereof;

whereby when quench oil is made to flow down the walls of the quench chamber, the inside diameter of the quench oil film is the same as the inside diameter of the termination of the effluent pipe.

2. An apparatus as in claim 1 wherein the ring extending upwardly and outwardly from the entry end of the quench chamber provides a curvilinear path for the quench oil to enter the quench chamber.

3. An apparatus as in claim 1 wherein the ring extending upwardly and outwardly from the entry end of the quench chamber is frusto-conical in shape.

4. An apparatus as in claim 3 further comprising a curved transition section between the frusto-conical ring and the quench chamber entry end.

5. An apparatus as in claim 1 wherein the means to shield the furnace effluent pipe from quench oil flowing over the ring is an annular baffle located between the ring and the terminus of the furnace effluent pipe.

6. An apparatus as in claim 5 further comprising insulation means arranged around the termination of the furnace effluent pipe.

7. An apparatus as in claim 6 further comprising a transfer pipe of larger diameter than the quench chamber arranged in series following the quench chamber to provide an abrupt termination of the quench chamber.

8. An apparatus as in claim 7 further comprising a purge gas chamber located above the shielding means with an inlet to the purge gas chamber from the exterior for the entry of inert purge gas such that the purge gas passes between the shielding means and the furnace effluent pipe to prevent entry of the furnace effluent into the insulation means.

9. An apparatus as in claim 8 further comprising a housing surrounding the quench chamber adapted to accommodate the quench oil reservoir, the annular baffle located between the ring and the terminus of the furnace effluent pipe, the purge gas chamber and the insulation means arranged around the termination of the furnace effluent pipe.

10. An apparatus as in claim 8 wherein the insulation means is solid compressible insulating material.

11. Apparatus as in claim 3 wherein the angle of the inverted frusto-conical ring is 45° to 10° with respect to the axis of the quench chamber.

12. An apparatus for direct quench of furnace effluent issuing from a furnace effluent pipe comprising:
- a quench chamber arranged in series following the furnace effluent pipe, which quench chamber is configured in the shape of the termination of the effluent pipe;
- a ring on the entry end of the quench chamber extending upwardly and outwardly therefrom in proximity to the terminus of the effluent pipe, which ring has a curvilinear path for the quench oil to enter the quench chamber;
- a quench oil reservoir arranged concentrically around the upper portion of the quench chamber extending above the top of the ring;
- means to introduce quench oil into the quench oil reservoir and over the upper edge of the ring into the interior of the quench chamber to flow down the walls thereof;
- a baffle between the effluent pipe and the ring; and
- a purge gas chamber above the baffle such that purge gas is conducted between the terminus of the effluent pipe and the baffle.

* * * * *